Feb. 16, 1960 P. ORR ET AL 2,924,990
TURBINE TRANSMISSION
Original Filed March 24, 1948 8 Sheets-Sheet 4
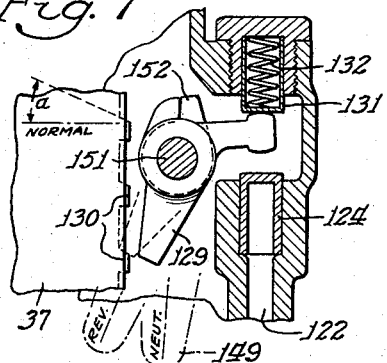
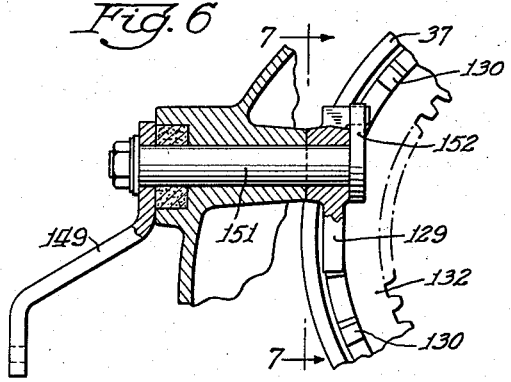
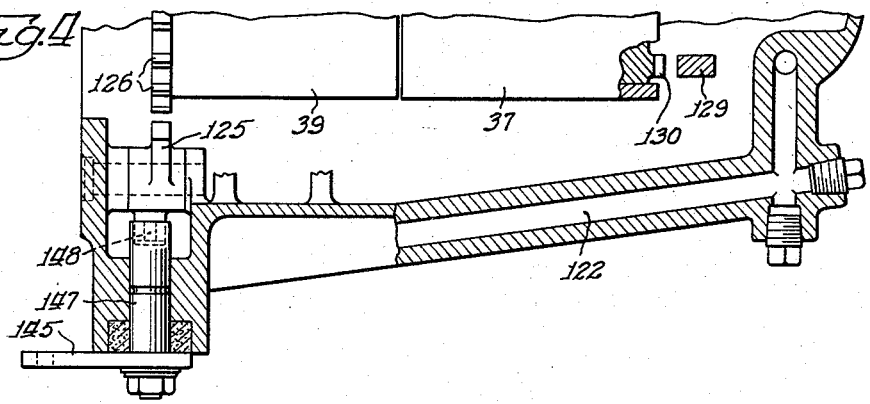
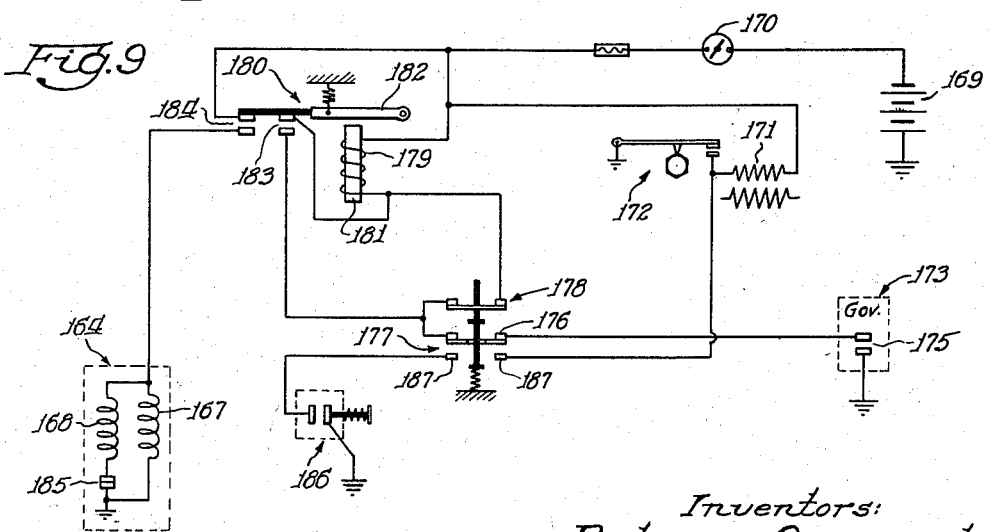
Inventors:
Palmer Orr and
Clifford L. Swift

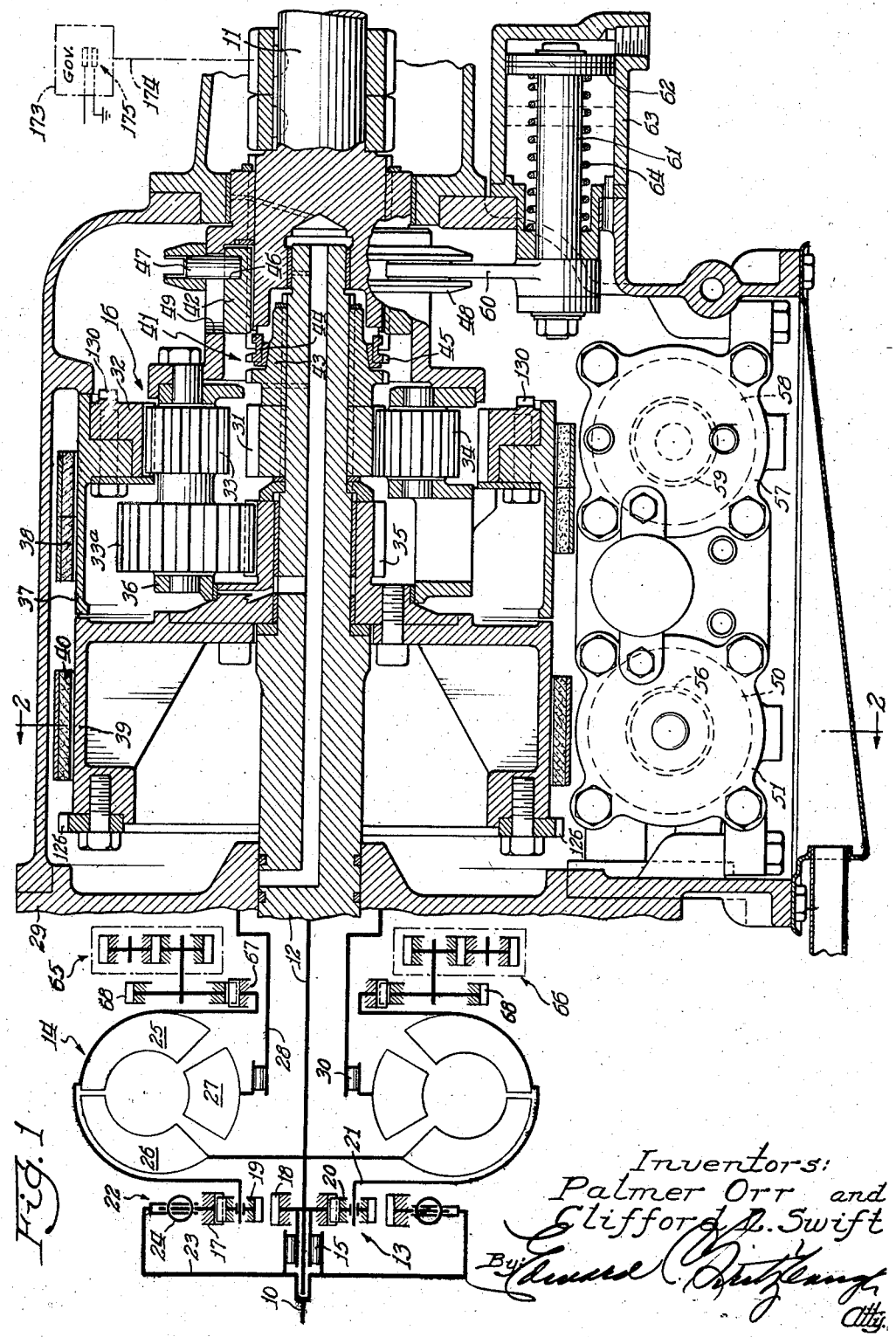

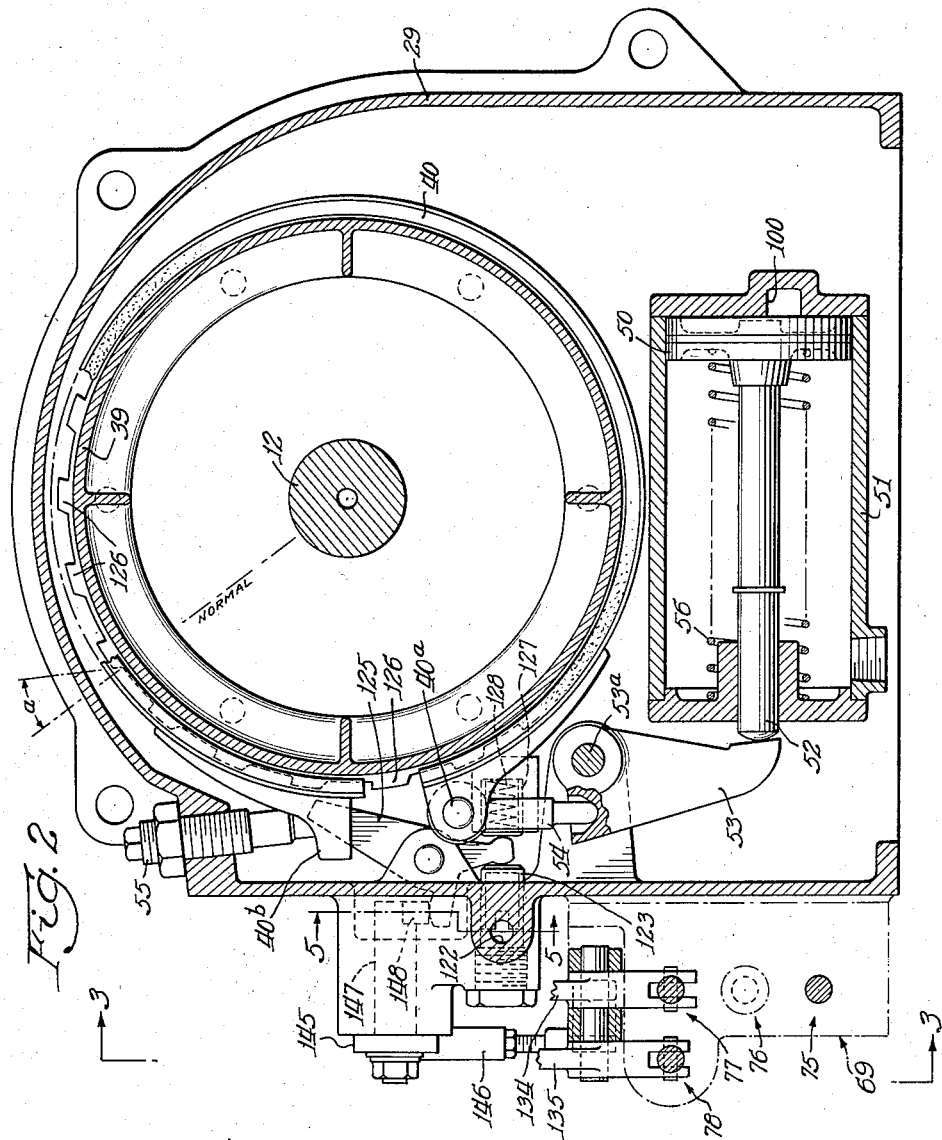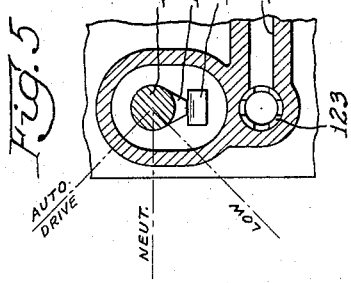

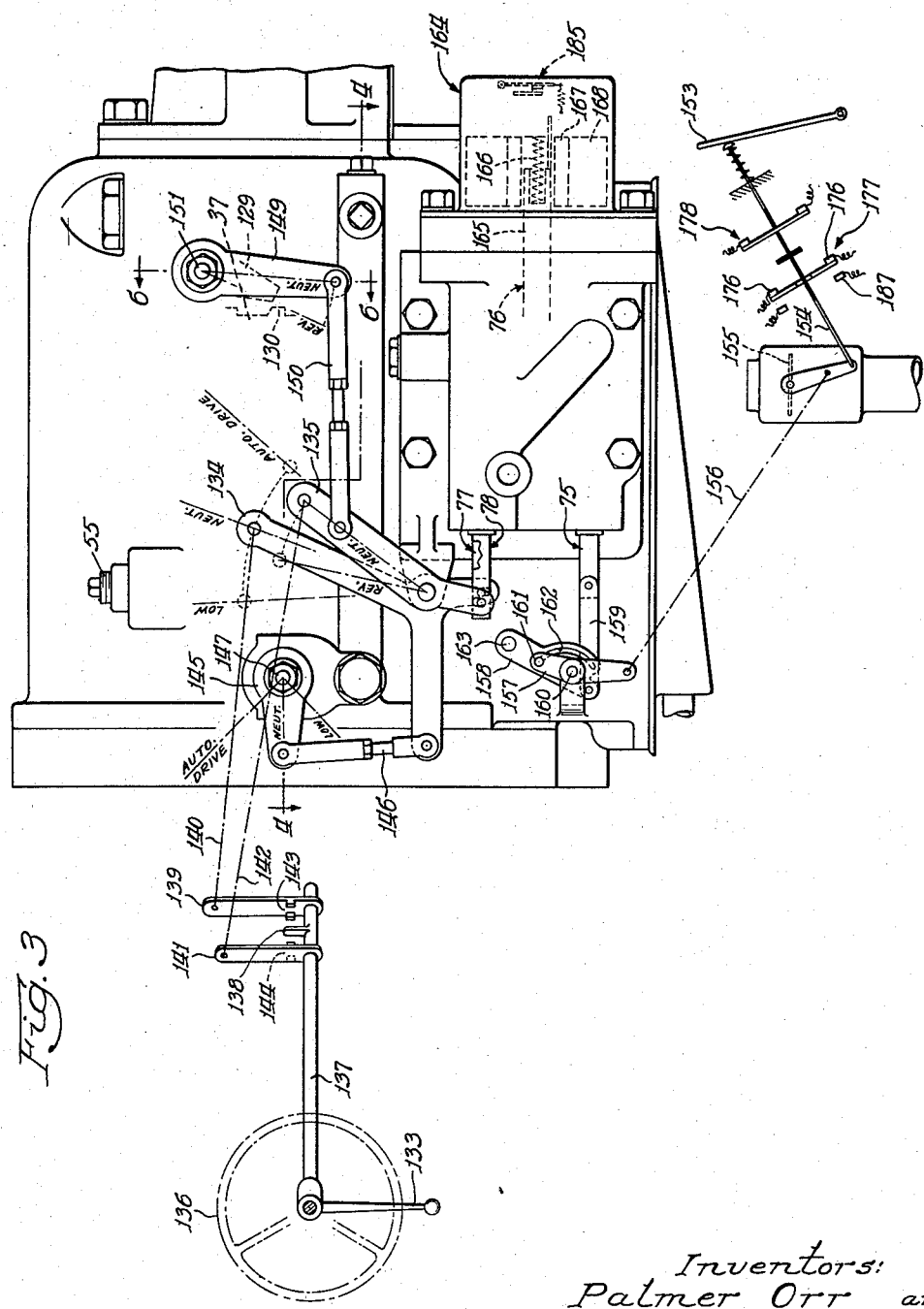

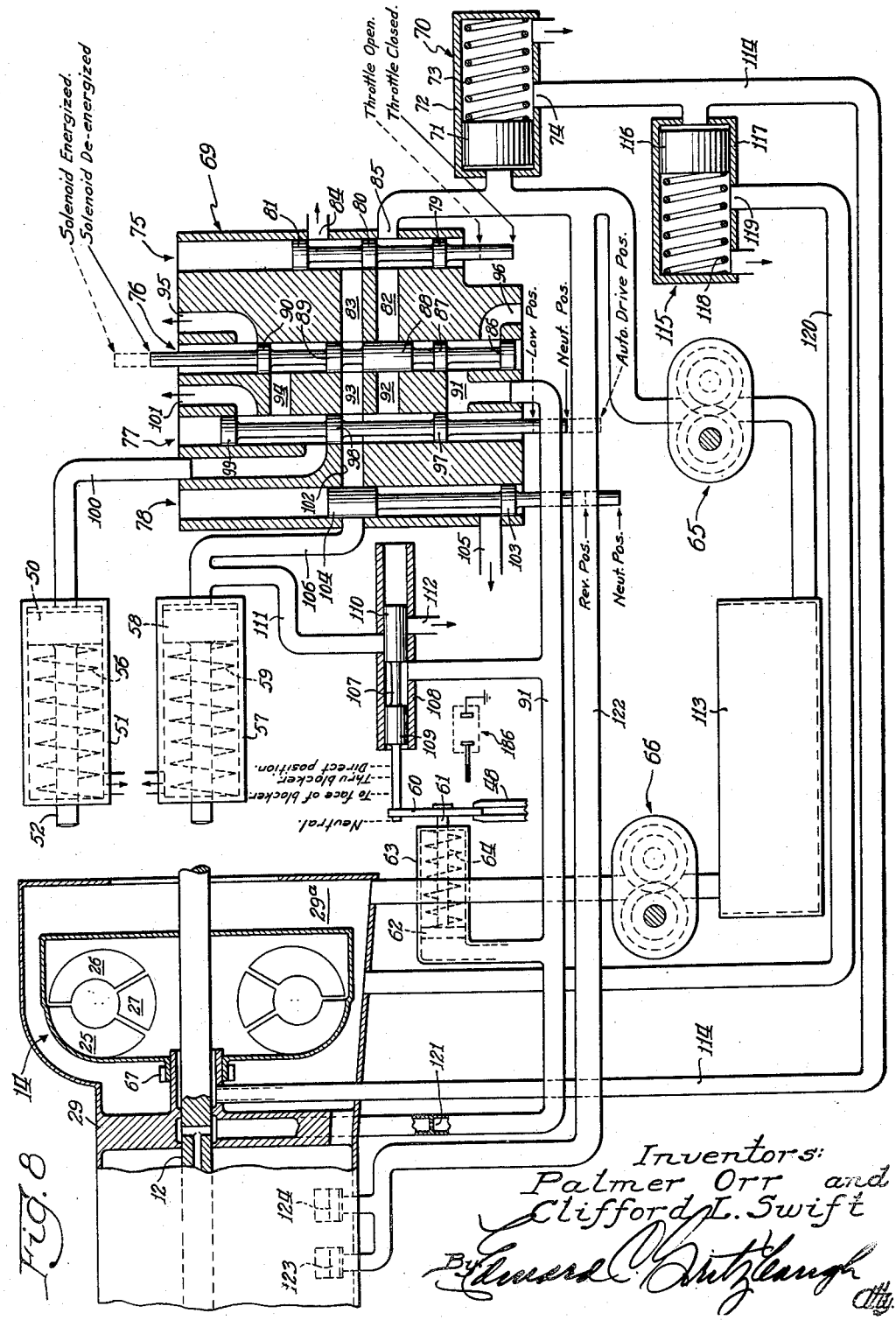

Inventors:
Palmer Orr and
Clifford L. Swift

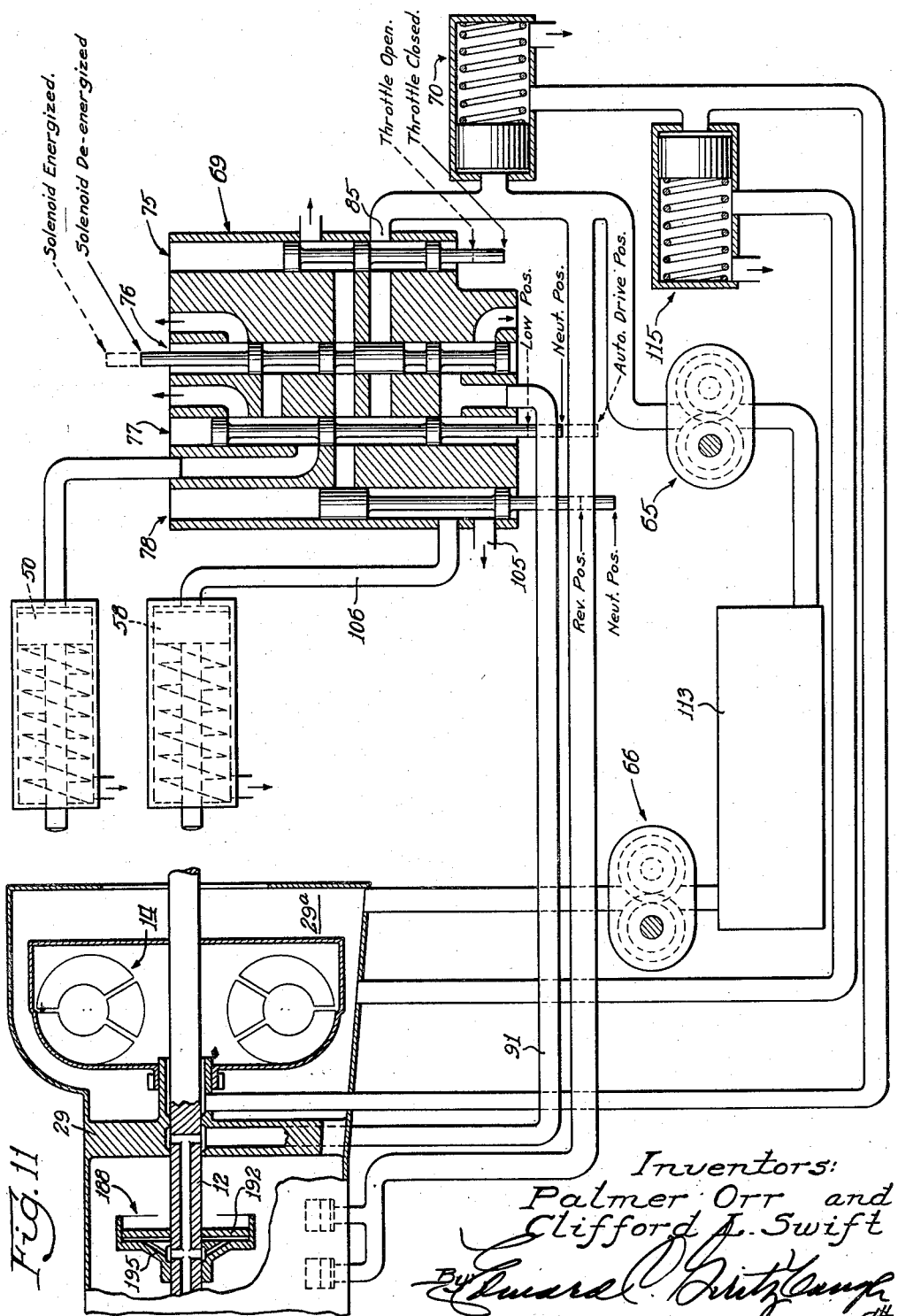

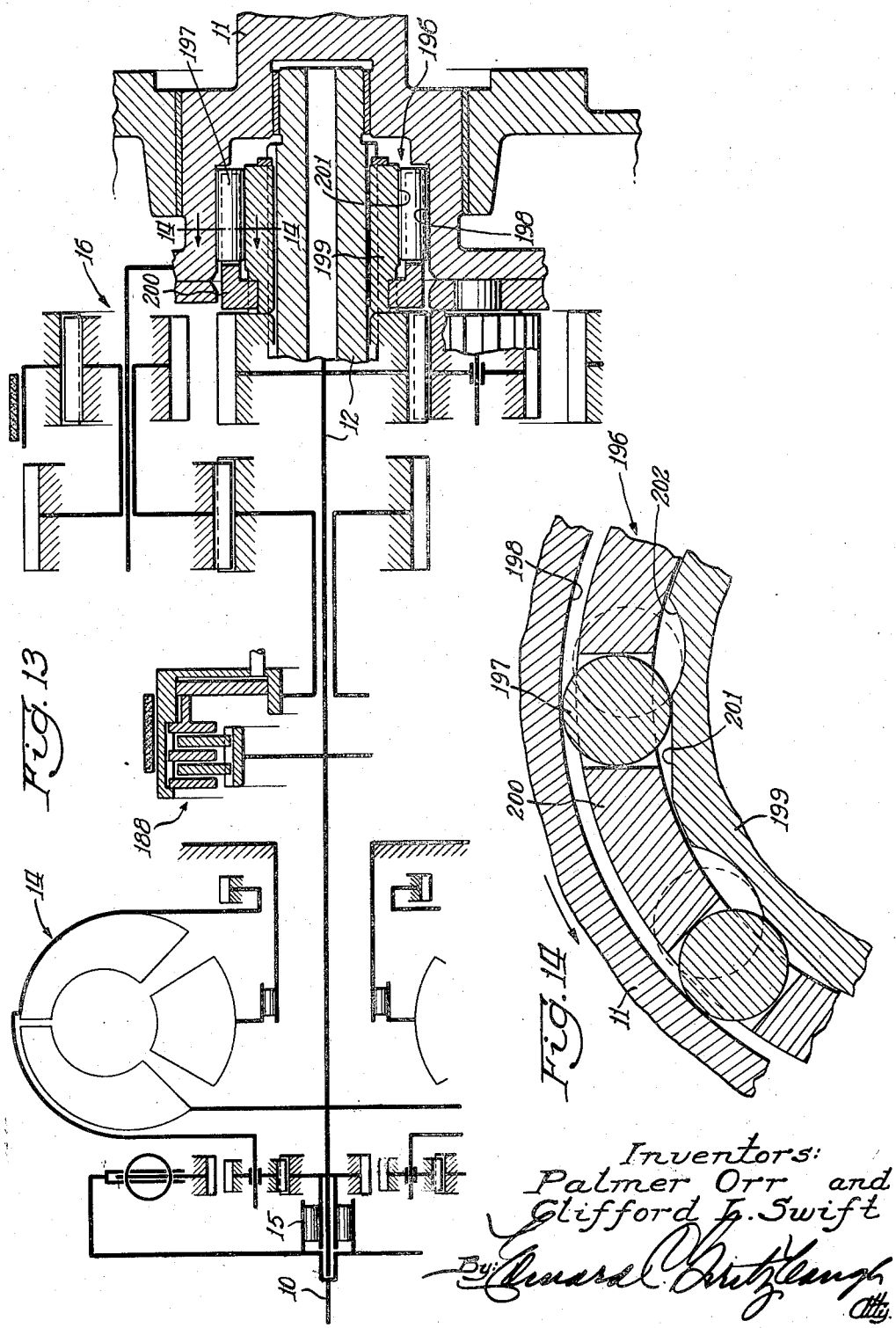

United States Patent Office 2,924,990
Patented Feb. 16, 1960

2,924,990

TURBINE TRANSMISSION

Palmer Orr and Clifford L. Swift, Muncie, Ind., assignors to Borg-Warner Corporation, Chicago, Ill., a corporation of Illinois Continuation of application Serial No. 16,845, March 24, 1948. This application February 23, 1954, Serial No. 411,622

40 Claims. (Cl. 74—645)

Our invention relates to transmissions for automotive vehicles and more particularly to such transmissions comprising hydrodynamic torque converting devices.

This application is a continuation of our application for "Turbine Transmission" Serial No. 16,845, filed March 24, 1948.

It is an object of the invention to provide an improved transmission having friction means and more particularly friction brakes for completing forward and reverse power trains through the transmission with the brakes or couplings preferably being under the control of the accelerator for the vehicle so that they are engaged to complete their respective power trains when the accelerator is moved from its closed throttle position toward an open throttle position.

It is another object of the invention to provide an improved gear set of the planetary type which gives substantially the same ratio for forward drive as for reverse drive.

It is also an object of the invention to provide such an improved transmission engaged by friction engaging means in a low speed ratio and comprising a positive type clutch for completing a high speed drive and it is an object in connection with such an arrangement to provide mechanism for braking one of the elements of the positive clutch prior to engagement of this clutch for the purpose of synchronizing the parts of the clutch to facilitate their engagement. This mechanism is considered particularly useful in connection with an arrangement in which the upshift into direct drive by engagement of the positive clutch is made when the accelerator is moved from an open throttle position to a closed throttle position.

It is a further object of our invention to actuate the friction brakes hereinbefore mentioned by means of fluid pressure generated by a pump driven by one of the transmission shafts and it is an object to provide manually actuated brakes for use in lieu of the friction brakes which may be used for completing power trains through the transmission when fluid pressure is not available for engaging the friction brakes. In this connection it is an object also to provide clutch mechanism for connecting the gearing of the transmission with the drive shaft exclusive of the hydrodynamic torque converting device for use in such parking gear ratios.

It is a further object of the invention to provide with a transmission having two friction means for completing forward and reverse power trains, a direct drive clutch of the positive type which is preferably engaged under the control of the accelerator, and it is a further object to provide a modified form of the transmission in which a friction clutch is substituted for the positive clutch so that a power shift may be had from a low forward speed ratio to a high forward speed ratio.

Our invention consists of the novel constructions, arrangements and devices to be hereinafter described and claimed for carrying out the above stated objects and such other objects as will appear from a description of preferred embodiments of the invention with reference being made to the accompanying drawings, in which:

Fig. 1 is a longitudinal sectional view of a transmission embodying the principles of the invention;

Fig. 2 is a sectional view of the transmission taken on line 2—2 of Fig. 1;

Fig. 3 is a side view of the transmission taken from line 3—3 of Fig. 2;

Fig. 4 is a sectional view taken on line 4—4 of Fig. 3;

Fig. 5 is a sectional view taken on line 5—5 of Fig. 2;

Fig. 6 is a sectional view taken on line 6—6 of Fig. 3;

Fig. 7 is a sectional view taken on line 7—7 of Fig. 6;

Fig. 8 is a diagram showing the hydraulic system for the transmission;

Fig. 9 is a diagram of the electrical system for the transmission;

Fig. 11 is a diagram showing the hydraulic system for the transmission shown in Fig. 10;

Fig. 13 is a diagrammatic illustration of another modification of the invention; and Fig. 14 is a sectional view on an enlarged scale taken on line 14—14 of Fig. 13.

Like characters of reference designate like parts in the several views.

Figure 10:
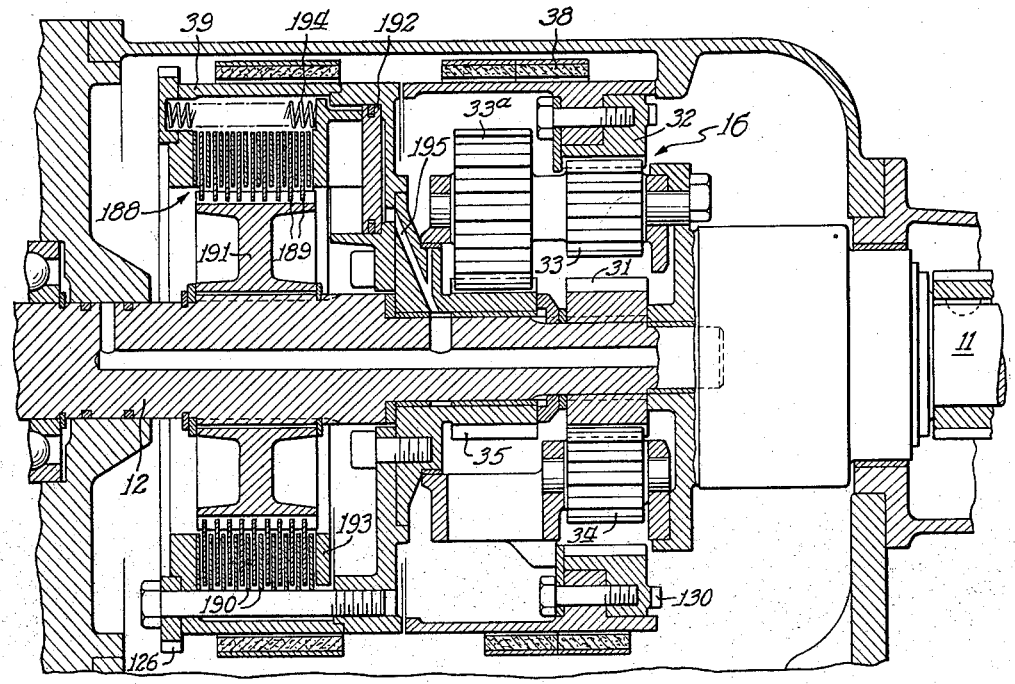
Fig. 10 is a sectional view of a modification of the invention.

Referring now to the drawings, the transmission illustrated in Fig. 1 comprises an input shaft 10, an output shaft 11, and an intermediate shaft 12. The intermediate shaft 12 is piloted within the shafts 10 and 11 as shown. The shafts 10 and 12 are connected by means of a planetary gear set 13 and a hydraulic torque converter 14, and the shafts 10 and 12 are also connected by means of a one-way roller type clutch 15. The shafts 12 and 11 are adapted to be connected by means of a planetary gear set 16.

The planetary gear set 13 comprises a ring gear 17, a sun gear 18, planet gears 19 and 20 and a planet gear carrier 21. The ring gear 17 is connected to the shaft 10 by means of a vibration dampener 22 and the usual flywheel 23 fixed to the shaft 10. The vibration dampener 22 is of standard construction and comprises springs 24 disposed between opposing parts of the dampener so that vibrations transmitted from the flywhel 23 to the ring gear 17 are absorbed by the springs.

The torque converter 14 comprises an impeller 25, a rotor 26 and a stator 27. The impeller 25 is connected with the planet gear carrier 21 and the rotor 26 is connected to the shaft 12 as shown. It will be noted that the sun gear 18 is also connected with the shaft 12. The stator 27 is rotatably mounted on a shaft 28 fixed with respect to the casing 29 of the transmission, and a one-way roller brake 30 is disposed between the stator and the shaft 28 for the purpose of preventing reverse rotation of the stator (that is, rotation opposite to the direction of rotation of the input shaft 10) while allowing roation of the stator in the forward direction.

The arrangement of the planetary gear set 13 and the torque converter 14 is very similar to that shown in Schneider Patent No. 2,333,681 and hence will not be described further in detail here.

The planetary gear set 16 comprises a sun gear 31, a ring gear 32, a planet gear 33 and a planet gear 34. The planet gears 33 and 34 are in mesh and gear 33 is also in mesh with the ring gear 32 and the gear 34 is also in mesh with the sun gear 31. The planet gear 33 is elongated and is provided with a gear portion 33a which is in mesh with a second sun gear 35 rotatably mounted on the shaft 12. The planet gears 33 and 34 are rotatably disposed on a planet gear carrier 36 which is fixed to the output shaft 11 of the transmission. The ring gear 32 is provided with a brake drum 37, and a brake band 38 is provided to act on the drum 37. The sun gear 35 is provided with a brake drum 39 and a brake band 40 is disposed on the drum for braking the drum and sun gear.

A positive clutch 41 is provided for selectively connecting the shafts 12 and 11, and this clutch comprises a shiftable clutch member 42 splined on the shaft 11 and a toothed hub member 43, with which the clutch member 42 is adapted to engage, splined to the shaft 12. A synchronizer blocker ring 44 is provided between the clutch member 42 in its disengaged position and the hub 43, this blocker ring having blocker teeth 45 for preventing movement of the clutch member 42 into engaged position until there is synchronization between the shafts 12 and 11. The clutch element 42 is provided with a peripheral slot 46 in which are disposed pins 47 carried by a collar 48 which is slidably mounted on the portion of the carrier 36 in which the clutch member 42 is disposed. The pins 47 are disposed in slots 49 of the carrier and the arrangement is such that the clutch member 42 may be shifted into or out of engaged position by means of the collar 48 and the connecting pins 47.

The planetary gear set 16 provides a low forward speed ratio, a direct drive and a reverse drive between the intermediate shaft 12 and the output shaft 11, and the intermediate shaft 12 is driven at all times by the planetary gear set 13 and the torque converter 14. It is intended that the input shaft 10 be connected with the driving engine (not shown) in an automotive vehicle and the output shaft 11 be connected with the driving wheels (not shown) of the vehicle.

When the shaft 12 is at rest, as for example when it is connected with the shaft 11 through one of the gear trains in the planetary gear set 16, the impeller 25 of the torque converter is driven at an increased speed with respect to the speed of the input shaft 10. This increase in speed is produced by the planetary gear set 13 which has its ring gear 17 driven from the input shaft 10 and has its sun gear 18 stationary along with the shaft 12. The carrier 21 connected with the impeller 25 rotates at an overdrive with respect to the shaft 10 under these conditions.

The stator 27 is held stationary during torque conversion by the converter 14 and in accordance with well-known principles of operation of such a converter, the reaction forces of the fluid on the stator change when the rotor 26 attains sufficient speed, and thereafter the stator will rotate freely in the forward direction due to the operation of the freewheeling brake 30. As the speed of the intermediate shaft 12 increases, the parts of the planetary gear set 13 will begin rotating more nearly at the same speed, and eventually the parts will be rotating at substantially the same speed. The shafts 10 and 12 will then be substantially directly coupled. The operation of the planetary gear set and torque converter combination is substantially as described in the above-mentioned Schneider patent hence it will not be set forth here in greater detail.

The low forward speed ratio through the gear set 16 is provided by engaging the brake band 40 to hold the drum 39 and thereby the sun gear 35 stationary. The sun gear 35 then acts as a reaction member and driving of the sun gear 31 fixed to the shaft 12 causes the carrier 36 and thereby the output shaft 11 to which the carrier is affixed to rotate at the low forward speed ratio.

The gear set 16 is changed to its high speed forward or direct drive condition by engaging the clutch element 42 with the toothed hub 43, with the brake band 40 being simultaneously released. The clutch member 42 is shifted by means of the collar 48 to bring it into mesh with the member 43, and the blocker ring 44 prevents such a complete movement of the clutch member 42 until the speeds of the shafts 12 and 11 are synchronized.

The blocker ring 44 also functions to bring about through frictional engagement with the hub member 43 such synchronization, and the synchronization may be initiated by a release of the accelerator of the vehicle to its closed throttle position as will hereinafter be more fully described.

Reverse drive is obtained through the gear set 16 by applying the friction brake band 38 with the band 40 and the clutch element 42 both being disengaged. Application of the brake band 38 causes the ring gear 32 to be held stationary so that this element of the gear set functions as a reaction member, and rotation of the sun gear 31 fixed to the shaft 12 causes the planet gear carrier 36 and thereby the output shaft 11 connected therewith to rotate in the reverse direction.

The transmission is hydraulically controlled and reference may be made particularly to the hydraulic diagram in the drawings for an understanding of the hydraulic control system. The brake band 40 is engaged by means of a hydraulic piston 50 slidably disposed in a cylinder 51 fixed with respect to the transmission casing 29 (see Fig. 2). The piston 50 is connected to a piston rod 52 which is adapted to act on a brake lever 53, and the lever 53 is connected by means of a link 54 with the movable end 40a of the brake band 40. The lever 53 is pivoted on a stud 53a and the link 54 extends into an opening within the lever 53 eccentrically located with respect to the stud 53a so that a rotation of the lever 53 in the clockwise direction about its stud 53a causes a movement of the link 54 upwardly as seen in Fig. 2. The other end 40b of the brake band is anchored with respect to the transmission casing 29 by means of a threaded stud 55. The piston 50 is adapted to be moved to the left as seen in Fig. 2 to engage the band 40 by means of fluid pressure, and a spring 56 is provided for returning the piston 50 to its original position.

The brake band 38 is engaged by a piston and lever arrangement similar to that just described for the brake 40 and hence not shown or described in detail, and this comprises a cylinder 57 having a piston 58 movable therein against the action of a return spring 59.

The collar 48 is engaged by a shift fork 60 (see Fig. 1) for shifting the collar and clutch member 42. The collar 60 is carried by a piston rod 61 fixed to a piston 62 slidably disposed in a cylinder 63. A spring 64 acts against the piston 62, and when fluid pressure is applied to the piston it functions to shift the piston together with the fork 60 against the action of the spring 64 to thereby shift the collar 48.

The hydraulic control system (see Fig. 8) comprises a pressure pump 65 and a scavenger pump 66. These pumps may be of any suitable type, such as the gear type, and they are each driven by means of gears 67 and 68 (see Fig. 1) through the shell of the torque converter 14 and thereby with the impeller 25. The pressure pump 65 supplies fluid under pressure to a valve block 69, and this pressure is maintained at a predetermined value by means of a relief valve 70. The relief valve 70 comprises a piston 71 slidably disposed in a cylinder 72 and acting against a spring 73. The relief valve 70 has a discharge opening 74 which is connected to the turbine 14 as will be hereinafter described. The valve 70 has a substantial cross section so as to act as an accumulator for fluid under pressure, and this attribute of the valve 70 is utilized for giving a quick engagement of the brake 40 under downshift conditions, as will be more fully described hereinafter.

Valves 75, 76, 77 and 78 are slidably disposed within suitable cavities in the valve block 69. The valve 75 is connected with the accelerator of the vehicle as will be hereinafter described, and this valve has lands 79, 80 and 81. Passages 82, 83, 84 and 85 are in communication with the cavity within which the valve 75 is disposed, and the passage 85 is connected with the pressure pump 65 as shown, and the passage 84 constitutes a vent to the transmission sump 29a, that is, to the chamber formed by the transmission casing 29.

The valve 76 is adapted to be controlled in accordance with vehicle speed as will be hereinafter described, and this valve comprises lands 86, 87, 88, 89 and 90, and, as shown, this valve is in communication with passages 82 and 83. Passages 91, 92, 93, 94, 95 and 96 are also in communication with this valve as shown. Both of the passages 95 and 96 constitute vents to the transmission sump 29a.

The valve 77 is adapted to be controlled in accordance with the position of an operator selecting lever as will be hereinafter described, and this valve comprises lands 97, 98 and 99, and as shown the valve is connected with the passages 91, 92, 93 and 94. The valve 77 is also connected with passages 100, 101 and 102. Passage 100 is connected with the brake operating piston 50, and passage 101 constitutes a vent to the transmission sump 29a. The valve 78 is adapted to be controlled also by the same selector lever as the valve 77, and the valve 78 comprises lands 103 and 104. This valve is connected with passage 102, and the valve is also connected with the passages 105 and 106. The passage 106 is connected with the brake operating piston 58, and the passage 105 constitutes a vent to the transmission sump 29a.

The valve 107 is disposed in a valve cylinder 108 fixed with respect to the transmission casing 29 and comprises lands 109 and 110, and as will be noted, the valve is connected with the passage 91. Passages 111 and 112 are also connected with the valve 107. The passage 111 connects the valve with the passage 106 and the brake operating piston 58, and the passage 112 constitutes a vent to the transmission sump 29a.

As will be noted, the scavenger pump 66 is connected with the transmission sump 29a and functions to keep this sump drained of fluid. The pump 66 discharges into a tank 113 for the operating fluid, which may be oil, and the pressure pump 65 uses the oil tank 113 as its source of fluid.

The turbine 14 is connected with the discharge opening 74 of the relief valve 70 by means of the passage 114 for keeping the turbine filled with fluid. The fluid pressure within the passage 114 and thereby within the turbine 14 is maintained constant by means of a relief valve 115 which comprises a piston 116 slidably disposed in a cylinder 117 fixed with respect to the transmission casing 29. The piston 116 is acted on by a spring 118 as shown. The cylinder 117 has a discharge opening 119 connected with a passage 120 which is connected with the transmission sump 29a, as shown.

The passage 91 to which fluid under pressure is supplied when a direct drive is in order is connected as shown with the piston 62 and also with the intermediate shaft 12 of the transmission through a metering jet 121. The fluid passing through the metering jet 121 to the shaft 12 is only for lubricating purposes.

The high pressure pump 65 is connected by a passage 122 with a sprag piston 123 and a sprag piston 124 which function to disengage certain sprags in the transmission which will now be described.

The sprag piston 123 (see Fig. 2) is adapted to coact with a sprag 125 adapted to engage sprag teeth 126 fixed to the periphery of the brake drum 39. The sprag 125 together with the sprag teeth 126 constitute a one-way positive type brake for the brake drum 39 as will be apparent from an inspection of the construction. The sprag 125 is engaged with the teeth 126 by a plunger 127 acted on by a spring 128.

The sprag piston 124 (see Fig. 7) is adapted to act on a sprag 129 which is adapted to engage sprag teeth 130 formed on the ring gear 37. A plunger 131 acted on by a spring 132 is provided for yieldingly holding the sprag 129 in engagement with the sprag teeth 130.

The valves 77 and 78 are moved between their various positions by a hand-operated selector lever 133 which is adapted to actuate, by any suitable linkage, two shift levers 134 and 135 located on the exterior of the transmission (see Fig. 3). The lever 133 may be located beneath the usual steering wheel 136 of the automotive vehicle. The lever 134 is connected with the valve 77, and this lever has three positions corresponding to three positions of the valve which are designated as "neutral," "low" and "automatic drive." The lever 135 is connected to move the valve 78, and this lever and valve have two positions, namely, "neutral" and "reverse."

The linkage connecting the lever 133 and the levers 134 and 135 may be of any suitable type and may comprise a rod 137 movable rotatably as well as longitudinally and carrying a finger 138. A lever 139 may be connected by a link 140 with the lever 134 and a lever 141 may be connected by a link 142 with the lever 135. Slots 143 and 144 may be provided in the levers 139 and 141 in which the finger 138 may engage upon suitable longitudinal movement of the rod 137 whereupon either of the rods 139 and 141 may be given suitable oscillatory movement to move the levers 134 and 135. The sprag 125 may be manually actuated by means of a lever 145 which is connected by a link 146 with the lever 134. The lever 145 is fixed on a shaft 147 which carries a dog 148 adapted to coact with the sprag 125. The sprag 129 may also be manually actuated by means of a lever 149 connected by a link 150 with the shift lever 135. The lever 149 is fixed to a shaft 151 which carries a dog 152 adapted to engage the sprag 129 for disengaging it from the teeth 130.

The valve 75 is adapted to be controlled in accordance with varying positions of the accelerator 153 of the vehicle. The accelerator is contemplated to be connected by any suitable linkage with the valve 75 so that the valve is given a movement upon an initial movement given the accelerator from a closed throttle position toward an open throttle position. The accelerator 153 is connected by any suitable linkage 154 with the throttle 155 of the automotive vehicle in which the transmission is installed and the accelerator may be connected by means of a link 156, two levers 157 and 158 and a second link 159 with the valve 75. The lever 157 is movable about a pivot point 160 and carries a pin 161 fitting in a slot 162 provided in the lever 158. The lever 158 is movable about a pivot point 163 and is connected by means of the link 159 with the valve 75.

The valve 76 is controlled by an electric solenoid 164 having an armature 165 connected with the valve. The solenoid comprises a spring 166 acting on the armature and two electrical windings 167 and 168 for moving the armature. The winding 168 is of larger size than the winding 167 and constitutes an energizing winding and the winding 167 is utilized for holding the armature in its actuated position as will hereinafter be described more fully.

The solenoid 164 is part of an electrical control system for the transmission shown in Fig. 9. This electrical system comprises the usual battery 169 of the automotive vehicle grounded at one terminal and connected at its other terminal with the usual ignition switch 170. The ignition switch is connected to the primary winding 171 of the ignition coil of the vehicle which in turn is connected with the usual interrupter 172.

The electrical system includes a governor 173 driven by the output shaft 11 of the transmission by any suitable linkage 174. The governor comprises a switch 175 which is closed above a predetermined speed of the output shaft 11 and thereby of the vehicle. One of the contacts of the switch 175 is grounded and the other is connected with one of the contacts 176 of an accelerator controlled kickdown switch 177, and the other of these contacts 176 is connected with an accelerator controlled closed throttle switch 178. The switch 178 is connected with the winding 179 of an electrical relay 180, and this winding is also connected with the ignition switch 170 as shown.

The relay 180 comprises a core 181 on which the winding 179 is disposed adapted to attract an armature 182. The armature 182 carries contacts 183 and 184, and the contact 184 carried by the armature when the relay is energized makes contact with another contact 184 connected with the windings 167 and 168 of the solenoid 164. When the relay 180 is energized, the contact 183 carried by the armature makes contact with another contact 183 which is connected with one of the contacts 176 as shown. The contact 184 carried by the armature 182 is connected with the ignition switch 170 and the contact 183 carried by the armature is connected with the lower end of the winding 179.

The solenoid 164 comprises a switch 185 which is actuated by movement of the armature 165 of the solenoid. The switch 185 is closed in the deenergized condition of the solenoid and is opened when the armature 165 of the solenoid moves to its solenoid energized position. The switch 185 is connected in series with the energizing winding 168 of the solenoid and is grounded at one end and is connected with the holding coil 167 as shown.

A switch 186 is provided which is controlled in accordance with positions of the clutch element 42 (see Fig. 8), the switch 186 being closed when the clutch member 42 is in its engaged position and being opened when the clutch member 42 is in its disengaged position. The switch 186 is connected with one of the contacts 187 of the kickdown switch 177 and is grounded, as shown. The other contact 187 in the switch 177 is connected with the end of the primary winding 171 of the ignition coil adjacent the interrupter 172.

The transmission is under the control of the selector lever 133 positioned adjacent the steering wheel of the vehicle and is also under the control of the accelerator 153 of the vehicle. As has been hereinbefore mentioned, the transmission provides a drive in low and high gear ratios forward and a drive in reverse, all of which include the torque converter 14. The transmission may be conditioned for a drive in either of the forward speed ratios by shifting the shift lever 134 from its neutral to its automatic drive position and in this condition of the transmission the low speed ratio may be completed by moving the accelerator 153 from a closed throttle position to an open throttle position and the high speed ratio may be thereafter completed above a predetermined speed of the vehicle by releasing the accelerator to allow it to return to its closed throttle position. The lever 134 is moved from its neutral to its automatic drive position by actuating the selector lever 133 to bring the finger 138 into engagement with the shift lever 139 in the slot 143 and thereafter shifting the lever 139 by means of the selector 133 to move the transmission lever 134 to its automatic drive position.

This movement of the lever 134 functions to move the valve 77 into its automatic drive position (see Fig. 3) so that the lands 98 and 99 of the valve embrace the passages 93, 94, 100 and 102, and the lands 97 and 98 embrace the passages 91 and 92. The low speed power train through the transmission may then be completed by depressing the accelerator 153 from its closed throttle position in which it is illustrated in Fig. 3 to open the throttle 155. This movement of the accelerator has the effect of moving the valve 75 from a throttle closed position to a throttle open position, and this movement of the valve is produced upon such a movement of the accelerator in a small range so that for the major portion of the movement of the accelerator in a throttle opening direction, the valve 75 is in and remains in its throttle open position.

This movement of the valve 75 upon such initial movement of the accelerator 153 in a throttle opening direction is produced by the levers 157 and 158. The lever 157 travels in accordance of travel of the accelerator 153 and its pin 161 moves in the slot 162 of the lever 158. The slot 162 for the major portion of its length is circular, however, the lever is so constructed that it must have a movement along with the pin 161 until the circular slot 162 is in such position that the pin can travel in the slot upon rotation of the lever 157 without movement of the lever 158. The pin 161 upon initial movement of the lever 157 functions to give a corresponding movement to the lever 158 until the slot 162 is oriented to be on the same center as the lever 157, and this movement of the lever 158 is transmitted through the link 159 to the valve 75.

Movement of the valve 75 from its throttle closed position to its throttle open position has the effect of causing the valve lands 79 and 80 to embrace the passages 82, 83 and 85, and fluid under pressure is thus supplied to the passages 82 and 83 from the passage 85. Prior to movement of the valve 75 pressure is supplied to the passage 82; however, due to the land 88 of the valve 76 blocking the passage 82, this fluid under pressure has no effect. Fluid under pressure thus produced in the passage 83 flows between the lands 88 and 89 of the valve 76 through the passage 93, between the lands 98 and 99 and through the passage 100 to the low speed brake cylinder 51 for acting on the piston 50 in this cylinder. Fluid acting on the piston 50 has the effect of engaging the brake band 40 on the drum 39 by means of the piston rod 52, the lever 53 and the link 54. The lever 53 rotates about its center 53a and exerts a force on the pin 54 located eccentrically with respect to the center 53a and through this pin moves the ends 40a and 40b of the brake band together to engage the brake band. This engagement of the brake band as will be apparent may be made gradually as desired simply by depressing the accelerator 153 slowly and giving a corresponding slow movement to the valve 75 so that the fluid under pressure is fed into the passages 83, 93 and 100 at a slow rate. With the brake band 40 thus being engaged, the low speed power train through the transmission is completed.

This drive in low speed forward is a freewheeling type of drive, that is, the drive through the planetary gear set 16 is broken when the accelerator 153 is released. With the accelerator being moved back to its closed throttle position from an open throttle position, the valve 75 is moved back to its throttle closed position, and in this position, the valve 75 connects the passages 83 and 84. The latter constitutes a vent to the transmission sump 29a and thus fluid acting on the piston 50 for the brake 40 is drained into the sump and disengages the brake band.

An upshift may be made from low speed ratio to high speed ratio with the transmission control lever 134 being in its automatic drive position by releasing the accelerator 153 from an open throttle position to its closed throttle position, assuming that the vehicle is traveling above a predetermined speed. At this predetermined speed the switch 175 of the governor 173 closes for conditioning the circuit through the winding 179 of the relay 180 for operation. When the accelerator 153 is moved to its closed throttle position, it functions to cause a closing of the switch 178 and this switch completes the circuit through the winding 179 of the relay 180. The circuit through the winding 179 includes the battery 169 and ignition switch 170 and includes also the closed throttle switch 178, the kickdown switch contacts 176 and the governor switch 175, and upon the switch 178 being closed while the switch 175 is closed, the relay winding 179 is energized to cause the armature 182 of the relay to move to close the relay switch contacts 183 and 184.

The relay contacts 183 are connected in parallel with the closed throttle switch 178, and after the relay has thus been energized, the closed throttle switch may thereafter be opened as by a movement of the accelerator to an open throttle position without causing a deenergization of the relay, and the contacts 183 thus function as holding contacts. The relay contacts 184 connect the ignition switch 170 and thereby the battery 169 with the windings 168 and 167 of the solenoid 164. Electric potential is thus applied to these windings for energizing the solenoid, and the solenoid armature 165 is thus moved against the spring 166 to move the solenoid valve 76 from its solenoid deenergized to its solenoid energized position (see Figs. 3 and 8). The solenoid 164 includes the switch 185 and movement of the armature to its energized position functions to open the switch to break the circuit through the energizing winding 168. This winding is thereafter inoperative for holding the armature in its energized position; however, the holding winding 167 is sufficient for this purpose.

The valve 76 when moved from its solenoid deenergized to its solenoid energized position has the groove between its lands 87 and 88 in communication with the passage 82 and 92 and its land 88 blocks the passages 83 and 93. Fluid pressure is thus made available to the passage 92 through the groove between the lands 87 and 88 from the passage 82, and this fluid under pressure in the passage 92 flows between the lands 97 and 98 in the valve 77 in the automatic drive position of the latter valve to the passage 91 which is connected with the direct shifting piston 62 for completing a shift to high speed condition of the transmission gear set 16 by shifting the clutch member 42 as will hereinafter be described in more detail. The solenoid valve 76 in the solenoid energized position connects the passages 94 and 95 through the groove between its lands 89 and 90, and the passage 100 is thereby connected with the passage 95 which is a vent to the transmission sump 29a for draining the cylinder 51 to disengage the brake 40. The passages 100 and 95 are connected by means of the groove between the lands 98 and 99 on the valve 77, the passage 94 and the groove between the lands 89 and 90 on the valve 76.

Application of fluid pressure to the piston 62 causes a movement of the piston and thereby of the clutch member 48 connected to move therewith in a clutch engaging direction. The blocker ring 44, however, as long as there is a difference in speed of the shafts 11 and 12 prevents a complete movement of the clutch member 42 into engaged position. As soon as the speeds of the shafts 11 and 12 become substantially equal, the blocker ring 44 in accordance with well-known principles of operation of such rings, oscillates to allow a complete movement of the clutch member 42 to engage with the teeth on the hub 43. The ring 44 also has the function of tending to frictionally synchronize the speeds of the shafts 12 and 11 as will be understood. The clutch 42 when thus fully engaged with the latter teeth clutches together the shafts 12 and 11 for a direct drive therebetween. As has been described, movement of the solenoid valve 76 is initiated by movement of the accelerator to its closed throttle position for closing the switch 178, and since the accelerator is in this position, with the vehicle traveling above a speed greater than that corresponding to idling speed of the engine, the engine functions to slow down the shaft 12 with respect to the shaft 11 to cause synchronism in speed of the shafts. As has been described, the same movement of the valve 76 that applies fluid pressure to the direct shifting piston 62 also drains the low speed cylinder 51 to disengage the brake 40, and therefore the brake 40 is disengaged at about the same time as the direct clutch member 42 is shifted to engaged position, and the transmission has thus been shifted into its direct drive or high speed condition due to this movement of the accelerator to its closed throttle position.

Another mechanism is also utilized for providing a quick synchronization of the shafts 12 and 11 on a shift to direct drive and this includes the valve 107 for applying the reverse brake 38 momentarily. The valve 107 is connected to be moved along with the piston 62, and when the clutch member 42 is moved into the position in which it is blocked by the blocker ring 44, the valve 107 has been moved to a position in which the groove between its lands 109 and 110 connects the passages 91 and 111. The passage 91, when the valve 76 is shifted for direct drive through the transmission, contains fluid under pressure, and this fluid under pressure is thereby applied to the piston 58 for the reverse brake 38 for applying the brake. This brake, when the passage 91 and 111 are so connected, functions to decelerate the engine and the shaft 12 at a rate greater than these parts would be ordinarily decelerated by the engine alone for hastening synchronization between the shafts 12 and 11 and for thereby hastening the shift of the clutch member 42. When the clutch element 42 moves through the blocker after synchronization of the shafts 12 and 11, the valve piston 107 moves therewith so that its land 109 blocks the passage 91 to the valve 106 and the groove between the lands 109 and 110 connect the passages 111 and 112 for draining the fluid within the cylinder 57 for the reverse band piston 58. The brake band 38 is thus disengaged on a completion of movement of the clutch member 42 to its engaged position.

A downshift may be made when the transmission is in direct drive from high speed ratio to low speed ratio by moving the accelerator 153 to its fully opened throttle position. The accelerator when moved to this position has the effect of actuating the kickdown switch 177 to break the circuit between the contacts 176 and close the circuit between the contacts 187. Opening the contacts 176 has the effect of deenergizing the relay 180 to open the relay contacts 183 and 184. Opening of the contacts 184 causes a deenergization of the solenoid 164, and the spring 166 then functions to move the armature 165 and the solenoid valve 76 back to their solenoid deenergized positions. In this position of the valve 76 the passage 91 is connected with the passage 96 which constitutes a vent to the transmission sump and the passage 91 and therefore the cylinder 62 are drained of fluid. The spring 64 may then be effective to move the piston 62 and the clutch member 42 back to their original positions in which the clutch member is disengaged from the teeth on the hub 43. The valve 76 in this position also functions to apply fluid under pressure to the low speed brake piston 50 through the passages 85, 83, 93 and 100 for again engaging the brake 40 for low speed ratio, the connection between the passages 93 and 100 being through the groove between the lands 98 and 99. The valve 70 for this downshift functions as a fluid accumulator for providing a quick supply of fluid under pressure to the low speed brake piston 50 to assure an immediate engagement of the brake 40. The engine of the vehicle thus will not be disconnected from the driven shaft 11 so as to race while the pumps build up sufficient pressure to engage the brake 40 for the downshift.

Although the spring 64 is effective for moving the clutch member 42 back to its disengaged position, such disengagement cannot take place until the drive from the shaft 12 to the shaft 11 is interrupted due to the pressure of the clutch teeth of the clutch member 42 and the hub member 43 on each other. It will be borne in mind that the accelerator for this downshift is at its full open throttle position and hence the engine normally with this throttle position is driving with full power. This interruption of torque is brought about by momentarily grounding the ignition system and in particular that point of the ignition system between the primary winding 171 and the interrupter 172. When the switch 177 is in its kickdown position it makes the circuit between its contacts 187, and this point of the ignition circuit is grounded through these contacts and through the switch 186. The switch 186, as has been described, is closed when the clutch element 42 is in its clutch engaged or direct drive position. When the ignition system is thus grounded, the driving engine of the vehicle becomes inoperative and there thus occurs a torque reversal between engine driving condition and engine driven condition so that the spring 64 may be effective to move the clutch member 42 to its clutch disengaged position. Upon such movement, the switch 186 is opened and even though the accelerator remains in its full throttle kickdown position, the ignition system nevertheless again becomes operative and the drive is in low speed forward ratio.

The transmission may be conditioned for a low forward speed drive in which the transmission cannot upshift due to any movement of the accelerator. For this drive the lever 134 is moved from its neutral position into its low position and this is done by means of the selector lever 133 adjacent the steering wheel 136 and the lever 139, the lever 139 simply being moved in the opposite direction from that in which it is moved for automatic forward drive. The valve 77 is connected with the lever 134 as has been described, and this movement of the lever 134 moves the valve 77 into its low position indicated in Fig. 3. In this position of the valve, the groove between the valve lands 97 and 98 connects passages 92 and 93 with the passage 100 leading to the low speed brake cylinder 51. The vehicle is started with the transmission being in this condition in the same manner as before, simply by depressing the accelerator whereupon the throttle valve 75 is moved from its throttle closed to its throttle open position to admit fluid under pressure to the passage 83 at a rate depending on accelerator movement for thereby engaging the brake band 40 in accordance with movement of the accelerator.

The solenoid 164, as in automatic drive, will be energized with this condition of drive when the vehicle is traveling above a predetermined speed if the accelerator should be released. With this drive, however, a movement of the valve 76 resulting from energization of the solenoid 164 does not function to cause a shifting of the transmission into high speed ratio but only functions to provide a two-way drive through the transmission instead of a one-way drive. With the valve 76 being in its solenoid energized position, the groove between the lands 87 and 88 connect the passages 82 and 92, and the valve 77 in its low position forms a connection by means of the groove between the lands 97 and 98 between the passages 92 and 100 and fluid pressure thus remains applied to the low brake piston 50 regardless of movement of the accelerator, since the groove between the lands 79 and 80 of the throttle valve 75 always provides a connection between the passages 82 and 85 regardless of movement of the accelerator. The land 97 of the valve 77 prevents a connection of the direct drive fluid line 91 and either of the fluid supply passages 92 and 93 with the valve 77 being in its low position. Prior to energization of the relay 180 by means of the governor 173 and the closed throttle switch 178 in this low forward drive, the low forward brake piston 50 is deenergized whenever the accelerator is moved back to its closed throttle position providing a one-way or a freewheeling type of drive through the transmission. This is due to the fact that when the valve 76 is in its solenoid deenergized position, the accelerator valve 75 drains the passages 100, 93 and 83 through the vent 84 when the valve 75 is moved back to its closed throttle position. Thus it is apparent when the relay 180 has once been energized in this low forward drive due to a release of the accelerator above the critical governor speed, the brake 40 remains engaged instead of being released whenever the accelerator is moved back into its closed throttle position.

The transmission is conditioned for reverse drive by having the lever 134 in its neutral position and moving the lever 135 from its neutral to its reverse position. This is done by giving a corresponding movement to the control lever 141 by means of the selector lever 133 and causing the finger 138 to preliminarily enter the slot 144. The lever 135 controls the valve 78 and when the lever 135 is moved into its reverse position it causes corresponding movement of the valve 78. When the valve 78 is in its reverse position, it connects the passages 102 and 106 through the groove between the lands 103 and 104. The piston 58 is thus fluid pressure actuated to cause an engagement of the reverse brake band 38 in the same manner as the brake band 40 is energized by the fluid pressure piston 50 for forward drive of the transmission, that is, the engagement given the band being proportional to the movement given the accelerator valve 75 by means of the accelerator.

The pawls 129 and 125 are provided so that a power train may be completed through the planetary gear set 16 without any fluid pressure being available. These are useful in case it is desired to park the vehicle on a hill and in this case the transmission will function to brake the car. The pawl 125 effective on the low speed forward brake drum 39 is effective for preventing the vehicle from rolling forward and the other pawl 129 effective on the other brake drum is for keeping the vehicle from rolling backward. The pawls are spring loaded, the spring 132 being effective on the pawl 129 and the spring 128 being effective on the pawl 125 for engaging the pawls. The lever 145 coacts with the pawl 125 and the lever 149 coacts with the pawl 129. Both of these levers are effective for moving the respective pawls out of their engaged positions when the transmission is conditioned for neutral and allowing engagement of the pawls when the transmission is conditioned for either forward or reverse.

The lever 149 is connected to the reverse lever 135, and when the latter lever is moved into its reverse position, it moves the lever 149 also into such a position by means of the link 150. The dog 152 fixed with respect to the lever 149 allows the spring pressed plunger 131 to move the pawl 129 into engagement with the teeth 130, and the pawl and teeth are then effective for braking the drum 37 to prevent the vehicle from rolling backward. The pawl thus completes a power train from the driven shaft 11 to the drive shaft 10, and this power train is through the one-way clutch 15. When the lever 149 is returned to its neutral position along with a similar movement of the lever 135, the dog 152 coacts with the pawl 129 to move the pawl back to its disengaged position.

The lever 145 is effective for causing engaging and disengaging movement of the pawl 125. The lever 145 is connected by means of the link 146 with the lever 134 which is used for conditioning the transmission for either automatic drive or low speed drive, and the lever 145 is moved into corresponding positions. The dog 148 is fixed with respect to the lever 145 and when the latter lever is in its neutral position the dog 148 coacts with the pawl 125 to hold the pawl out of engagement with the teeth 126 on the brake drum 39. When the lever 145 is in either of its automatic drive or its low positions, the dog 148 is rotated so that the spring pressed plunger 127 may cause engagement of the pawl 125 with the teeth 126. The pawl 125 when engaged with the ratchet teeth 126 is effective to keep the vehicle from rolling forward. The pawl thus completes a power train from the driven shaft 11 to the drive shaft 10, and this power train also is through the one-way clutch 15. As will be understood when its is desired to keep the vehicle from rolling backward by engaging a power train through the transmission it is only necessary to condition the transmission for reverse drive by means of the selector lever 133 located adjacent the steering wheel 136 and in order to similarly prevent the vehicle from rolling forward, it is only necessary to condition the transmission for forward drive by means of the selector 133.

The pistons 123 and 124 are provided for moving the pawls 125 and 129 into their disengaged positions whenever the engine of the vehicle is running. Referring to the hydraulic diagram (see Fig. 8) it will be seen that these pistons are connected by means of the passage 122 with the pressure pump 65. The pressure pump 65 being driven by the planet gear carrier 21 and along with the impeller 25 is operative whenever the engine of the vehicle is operative to produce a fluid pressure which is effective on the pistons 123 and 124 to disengage the pawls 125 and 129. It will be apparent that both of the pawls 125 and 129 constitute one-way brakes as these pawls cooperate with the teeth 126 and 130 respectively, and the arrangements are such that these brakes will tend to overrun when the engine starts to drive.

The sides of the teeth 126 and 130 which coact with the corresponding pawls 125 and 129, are inclined at an angle $a$ (see Figs. 2 and 7) which in this embodiment is approximately 30° from normals to the respective wheels, as shown, and the ends of the pawls are similarly inclined to fit these tooth sides. We contemplate that this angle shall be slightly less than the friction angle between the sides of the teeth 126 and 130 and the coacting ends of the pawls, and we mean by the friction angle, that angle slightly greater than the angle $a$ at which slipping would begin between the pawls and coacting teeth when the members 32 and 39 are under load. We contemplate that the angle $a$ shall be such that when the members 39 and 32 are under load the pawls may be withdrawn from the teeth 126 and 130 manually by means of the selector lever 133 but without extreme effort and the pawls will not disengage without such manual actuation and due only to load on the members 39 and 32. Although in the illustrated embodiment the angle $a$ is approximately 30°, it will be understood that this angle will vary with the distance the shafts supporting the pawls, such as the shaft 151, is from the toothed faces of the members 39 and 32, as well as with the length of the pawls.

Figure 12:
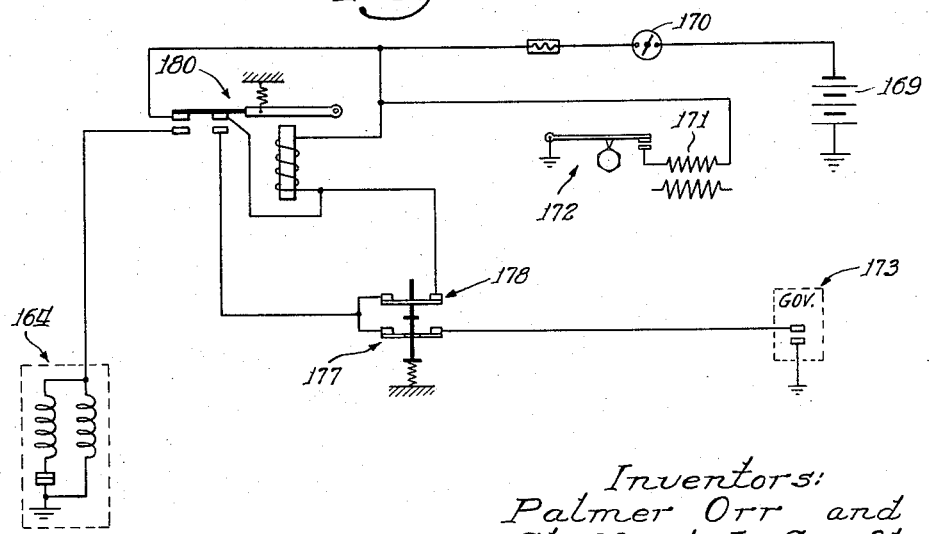
Fig. 12 is a diagram showing the electrical system for the transmission shown in Fig. 10.

Referring now to Figs. 10, 11 and 12 showing a modified form of the invention, it will be seen that the gear set of the modified form differs from the transmission just described only essentially in that a friction clutch 188 connecting the brake drum 39 with the intermediate shaft 12 is substituted for the positive clutch comprising the clutch member 42. The friction clutch 188 comprises clutch plates 189 and 190, the plates 189 being splined to a hub member 191 which is fixed to the shaft 12 and the clutch plates 190 being splined within the brake drum 39. A piston 192 is provided within the drum 39 and actuates a pressure plate 193 to engage the clutch plates 189 and 190 with each other. Retractor springs 194 (one being shown in the drawing) are provided for the pressure plate 193. The sun gear 35 and the shaft 12 are provided with a passage 195 for supplying fluid under pressure to the piston 192.

The hydraulic controls for the modified form of the invention are essentially the same as the controls for the first form of the invention with the exception that the passage 91 instead of simply leading to the inner cavity of the shaft 12 for lubricating purposes is connected through the passage 195 with the piston 192. Since the positive clutch is not present in this form of the invention the cylinder 63 and piston 62 together with the valve 107 are not provided. In these controls, the conduit 106 is also brought into the valve block 69 at a different point which is closer to the passage 105. The electrical system shown in Fig. 12 differs from that of the first form of the invention shown in Fig. 9 only in that the ignition grounding circuit including the switch 186 and contacts 187 are not provided.

The second form of the invention operates in substantially the same manner as the first form with the exception that the friction clutch 188 connecting the sun gear 35 and shaft 12 is engaged for locking up the planetary gear set 16 in lieu of the positive clutch comprising the clutch member 42. The kickdown from the high speed forward ratio to the low speed forward ratio is obtained in the same manner and the clutch 188 is disengaged instead of the positive clutch provided in the first form of the invention. Since the torque reversal is not necessary for disengaging a friction clutch, the ignition grounding system utilized in the first form of the invention is not needed for the second form of the invention.

The embodiment of the invention shown in Figs. 13 and 14 is substantially the same as that shown in Figs. 10 to 12 with the exception that a free wheeling clutch 196 is added between the shafts 12 and 11. This clutch comprises rollers 197 disposed between a hollow cylindrical surface 198 and a hub member 199 splined to the shaft 12. A cage 200 is provided for holding the rollers 197 in spaced relation to each other. The hub member 199 is provided with cams 201 and recesses 202 in its outer surface as shown (see in Fig. 14).

The relationship between the rollers 197, the cylindrical surface 198, and the cams 201 is such that if the driven shaft 11 of the transmission tends to rotate faster than the shaft 12 the rollers 197 will engage between the cams 201 and cylindrical surface 198, so that the shaft 12 will be driven along with the shaft 11. In this case the one-way roller clutch 15 will also engage to drive the shaft 10 from the shaft 12, and there will be a direct connection from the shaft 11 to the shaft 10. This connection is useful for starting the engine connected to the shaft 10 by driving the shaft 11 by movement of the vehicle as by pushing or towing the vehicle, and it is not necessary to have fluid pressure available in order to engage any of the friction bands or clutches. Under ordinary conditions in which the shaft 12 is driving, as through gear set 16, the one-way clutch 196 overruns.

Our improved transmissions advantageously comprise only a single friction means which must be engaged for either a starting forward or a starting reverse drive. These means, which are friction brakes in the actual embodiments, are disengaged when no fluid pressure is supplied to them. Thus, with the first and second embodiments of the invention, the vehicle can be pushed or towed in neutral condition of the transmission without difficulty. The gear sets we utilize advantageously are such that the same ratio may be provided in low forward drive as in reverse.

In an actual gear set if the gears 32, 33, 34, 31, 33a and 35 have respectively 54, 12, 12, 21, 21 and 21 teeth respectively, both forward low speed and reverse ratios are 1.57 to 1.00.

Our improved transmissions advantageously include the positive sprags 125 and 129 to allow parking in gear even though there is no fluid pressure available for engaging the friction brakes. The sprags and teeth with which they engage are advantageously inclined so that these sprags may be disengaged by manual effort. Fluid pressure operated pistons are provided for disengaging the sprags when the vehicle engine begins to operate, and the sprags and teeth are furthermore so shaped that the teeth overrun the sprags when the engine starts to drive.

The valve arrangement comprising the throttle valve 75 at oil entry passage 85, the solenoid operated valve 76 next and the forward and reverse valves 77 and 78 last is considered advantageous.

The power upshifted feature comprising the friction clutch 188 in the second embodiment is considered meritorious, and the arrangement for momentarily applying the reverse brake 38 in the first embodiment to hasten synchronization of the clutch member 42 and hub 43 prior to engagement of the clutch member is considered advantageous.

A reliable downshift without engine race is obtained with use of the fluid pressure accumulator.

We wish it to be understood that our invention is not to be limited to the specific constructions and arrangements shown and described except only insofar as the claims may be so limited, as it will be apparent to those skilled in the art that changes may be made without departing from the principles of the invention. In interpreting the following claims, we wish it to be understood that where we call for an engaging means or a friction engaging means or the like, we wish such engaging means to be construed to include not only a brake but also a clutch.

We claim:

1. In transmission mechanism, the combination of a drive shaft, a driven shaft, means for providing a low speed power train between said shafts, means for providing a higher speed power train between said shafts and including a positive type clutch for completing the power train, a brake for one of said shafts for synchronizing the shafts prior to engagement of said positive clutch to change the drive from said low speed power train to said high speed power train, a fluid pressure operated piston for engaging said brake, a source of fluid pressure, and a valve movable with the movable element of said positive clutch for connecting said fluid pressure source and said piston during movement of the movable clutch part between its engaged and disengaged positions during a change from said low speed power train to said high speed power train for causing said brake to be effective for synchronizing the shafts prior to engagement of said positive clutch.

2. In transmission mechanism, the combination of a drive shaft, a driven shaft, means for completing relatively low and high speed power trains, said last-named means including a positive type clutch engageable for completing said high speed power train between said shafts, said clutch comprising a clutch part movable into engagement with a second clutch part, a blocker ring for said movable clutch part for preventing engagement of said clutch parts until synchronism of speed occurs between the clutch parts, a brake effective for braking one of said shafts for causing synchronization between said clutch parts so that said movable clutch part may engage with said second-named clutch part, and means for actuating said brake including a fluid pressure actuated piston, a source of fluid pressure, and a valve between said piston and fluid source and actuated by said movable clutch part upon movement thereof into its engaged position to establish said high speed power train whereby to apply said brake when the movable clutch part is intermediate its engaged and disengaged positions.

3. In transmission mechanism for an automotive vehicle, the combination of an accelerator for the vehicle, a drive shaft, a driven shaft, means for providing a power train between said shafts and including a positive type clutch comprising a clutch part movable into engagement with a second clutch part, a source of fluid pressure, a piston connected with said movable clutch part, means under the control of said accelerator for connecting said fluid pressure source and said piston to engage said clutch when said accelerator is moved from a closed throttle position to an open throttle position, a brake effective for retarding rotation of one of said shafts for thereby causing synchronism between said clutch parts prior to their engagement, a piston for engaging said brake, and a valve movable with said movable clutch part for effectively connecting said fluid pressure source and said last-named piston when said movable clutch part is intermediate its clutch disengaging and its clutch engaging positions.

4. In transmission mechanism, the combination of a drive shaft, a driven shaft, means for providing a forward drive power train between said shafts and including a positive type clutch for completing the power train when engaged, said clutch comprising two engaging clutch elements, means for providing a reverse drive power train between said shafts and including a friction engaging means completing the power train when engaged, and means for partially engaging said friction engaging means to retard the speed of one of said clutch elements for thereby synchronizing the speeds of the clutch elements when a shift is made to complete said forward drive power train.

5. In transmission mechanism, the combination of a drive shaft, a driven shaft, means providing a low speed forward drive power train between said shafts, means providing a high speed forward drive power train between said shafts and including a positive clutch, said clutch comprising two engaging parts, means providing a reverse drive power train between said shafts and including a friction engaging means, and means for partially engaging said friction engaging means to synchronize the speeds of the engaging parts of said positive clutch when the transmission mechanism is being shifted from low speed forward drive to high speed forward drive.

6. In transmission mechanism, the combination of a drive shaft, a driven shaft, a planetary gear set, means for completing a low speed forward drive through said gear set and including a brake for an element of the gear set, a positive type clutch for locking up said gear set to provide a 1–1 drive between said shafts, said clutch comprising two engaging parts one movable into mesh with the other, a friction brake for an element of said gear set for completing a reverse drive power train through the gear set, and means controlled by movement of the movable part of said positive clutch for partially engaging said friction brake for synchronizing the speeds of the parts of said positive clutch when said movable clutch part is being moved from its clutch disengaging position to its clutch engaging position.

7. In transmission mechanism for an automotive vehicle, the combination of an accelerator for the vehicle, a drive shaft, a driven shaft, a planetary gear set, means for completing a low speed forward drive through said gear set, means for completing a high speed forward drive through said gear set and including a positive type clutch, said clutch comprising a movable clutch part movable into mesh with a second clutch part, means for completing a reverse drive power train through said gear set and including a friction brake for completing the drive, means under the control of said accelerator for breaking said low forward speed power train and for engaging said positive clutch for completing said high speed forward drive when the accelerator is moved from a closed throttle position toward an open throttle position, and means under the control of the movable part of said positive clutch for partially engaging said friction brake for synchronizing the parts of the positive clutch when said movable clutch part is moving between its disengaged and its engaged positions.

8. In transmission mechanism for an automotive vehicle, the combination of an accelerator for the vehicle, a drive shaft, a driven shaft, a planetary gear set, means for completing a low speed forward drive through the gear set and including a friction brake, means for completing a direct drive between said shafts and including a positive clutch between the shafts, said clutch comprising a movable clutch part movable into mesh with a second clutch part, means for completing a reverse drive through the gear set and including a brake for one of the elements of the gear set, means under the control of said accelerator for causing a disengagement of said first-named brake and engagement of said clutch when said accelerator is moved from a closed throttle position to an open throttle position, and means for causing a partial engagement of said friction brake for said reverse drive for synchronizing the speeds of the positive clutch parts prior to engagement thereof and including a source of fluid pressure, a fluid pressure actuated piston for engaging said last-named brake, and a valve movable with the movable clutch part of said positive clutch to apply fluid pressure from said pressure source to said piston when said movable clutch part is moving between its disengaged and its engaged positions.

9. In a transmission, the combination of a drive shaft, a driven shaft, a power operated engaging means for completing a power train between said shafts, a source of power adapted to be connected with said engaging means and operated by one of said shafts for engaging the engaging means, a manually operated engaging means for use in lieu of said first-named engaging means for completing said power train when said source of power is inoperative, and power responsive means connected with said source of power and operative on said second-named engaging means for automatically disengaging this engaging means when the source of power becomes operative.

10. In a transmission, the combination of a drive shaft, a driven shaft, a gear set, a fluid pressure engaged brake for an element of said gear set for completing a power train through the gear set and between said shafts, a source of fluid pressure operated by one of said shafts adapted to be connected with said brake for engaging the brake, a manually operated brake for said element for use in lieu of said first-named brake when said source of power is inoperative, and piston means associated with said manually operated brake and connected with said fluid pressure source for automatically disengaging said manually operated brake when said fluid pressure source becomes operative.

11. In a transmission, the combination of a drive shaft, a driven shaft, a gear set, a fluid pressure engaged brake for an element of said gear set for completing a power train through the gear set and between said shafts, a source of fluid pressure operated by one of said shafts and adapted to be connected with said brake, and a manually controlled pawl for said element for holding the element from rotation in one direction but not in the other for completing said power train from said driven shaft to said drive shaft but not from said drive shaft to said driven shaft when said fluid pressure source is inoperative.

12. In a transmission, the combination of a drive shaft, a driven shaft, a gear set, a fluid pressure engaged brake for an element of said gear set for completing a power train through the gear set and between said shafts, a source of fluid pressure operated by one of said shafts and adapted to be connected with said brake, a pawl adapted to be manually controlled and operative on said gear set element for holding the element from rotation in one direction but not in the other for thereby completing said power train from said driven shaft to said drive shaft but not from said drive shaft to said driven shaft, and piston means connected with said source of fluid pressure for automatically disengaging said pawl when the fluid pressure source is operative.

13. In a transmission, the combination of a drive shaft, a driven shaft, a gear set, an engaging means for completing a forward drive through said gear set and between said shafts, an engaging means for completing a reverse drive through said gear set and between said shafts, both of said engaging means being power operated, and a manually controlled one-way engaging means for use in lieu of each of said two first-named engaging means for completing said respective power trains when the drive is from said driven shaft to said drive shaft but overrunning and breaking said power trains when the drive is in the opposite direction.

14. In a transmission, the combination of a drive shaft, a driven shaft, a gear set, a fluid pressure engaged engaging means for completing a forward drive power train through the gear set and between said shafts, a fluid pressure engaged engaging means for completing a reverse drive power train through the gear set and between said shafts, a source of fluid pressure operated by one of said shafts and adapted to be connected with either of said engaging means, and a manually controlled one-way engaging means for use in lieu of either of said first-named engaging means when said fluid pressure source is inoperative, said one-way engaging means corresponding to said first-named forward speed engaging means completing said forward drive power train through the gear set when said driven shaft is driving and said other one-way engaging means completing said reverse drive power train through said gear set when said driven shaft is driving.

15. In a transmission, the combination of a drive shaft, a driven shaft, a gear set, a fluid pressure engaged brake for an element of said gear for providing a forward drive through the gear set and between said shafts, a fluid pressure engaged brake for another element of the gear set for providing a reverse drive through the gear set and between said shafts, a source of fluid pressure operated by one of said shafts and adapted to be connected to either of said brakes, a manually controlled pawl for said first-named element for completing said forward drive power train when said driven shaft tends to drive by overrunning and breaking the power train when said drive shaft drives, and a pawl operative on said second-named element for completing said reverse drive power train when said driven shaft tends to drive by breaking the power train when said drive shaft drives.

16. In a transmission, the combination of a drive shaft, a driven shaft, a gear set, a fluid pressure engaged brake for one element of said gear set for completing a forward drive through the gear set and between said shafts, a fluid pressure engaged brake for another element of said gear set for completing a reverse drive power train through the gear set and between said shafts, a source of fluid pressure operated by one of said shafts, a pawl providing a one-way brake for said first-named element and engaging for a drive through said forward drive power train from said driven shaft to said drive shaft and disengaging for the other direction of drive, a manually controlled pawl for the other of said elements of said gear set and engaging to complete said reverse drive power train when said driven shaft drives and disengaging when said drive shaft drives, and piston means connected to be actuated by said source of fluid pressure for disengaging said pawls when said fluid pressure source is operative.

17. In a transmission, the combination of a drive shaft, a driven shaft, an intermediate shaft, a hydrodynamic coupling device driven by said drive shaft and adapted to drive said intermediate shaft, means including a power operated engaging means for completing a power train between said intermediate and said driven shafts, a one-way engaging means adapted to be manually operated for completing said power train between said intermediate and said driven shafts in lieu of said first-named engaging means when said driven shaft tends to do the driving, and a one-way engaging means for completing a power train between said intermediate and said drive shafts exclusive of said hydrodynamic device whereby the intermediate shaft may drive said drive shaft.

18. In a transmission, the combination of a drive shaft, a driven shaft, an intermediate shaft, a hydrodynamic coupling device driven by said drive shaft and adapted to drive said intermediate shaft, means for completing a power train between said intermediate and said driven shaft and including a fluid pressure engaged engaging means, a source of fluid pressure operated by one of said shafts and adapted to be connected with said engaging means, a manually actuated engaging means adapted for use in lieu of said first-named engaging means for completing said power train between said intermediate shaft and said driven shaft, said manually actuated engaging means being of the one-way type and completing said power train only when said driven shaft tends to do the driving, and a one-way clutch for completing a power train between said intermediate and drive shafts for driving said drive shaft from said intermediate shaft exclusive of said hydrodynamic device.

19. In a transmission, the combination of a drive shaft, a driven shaft, an intermediate shaft, a hydrodynamic coupling device driven by said drive shaft and adapted to drive said intermediate shaft, means for completing a power train between said intermediate and said driven shafts and including a gear set and a power operated brake for an element of said gear set, a manually operated brake for said gear set element for use in lieu of said power operated brake, said manually operated brake including a pawl providing a one-way engagement with said gear set element whereby to complete said power train when said driven shaft tends to do the driving, and a one-way clutch between said intermediate and said drive shaft for completing a power train from said intermediate to said drive shaft exclusive of said hydrodynamic device.

20. In a transmission, the combination of a drive shaft, a driven shaft, an intermediate shaft, a hydrodynamic coupling device driven by said drive shaft and adapted to drive said intermediate shaft, means providing a forward drive power train between said intermediate and said driven shafts and including a gear set and a fluid pressure engaged brake for an element of the gear set, means providing a reverse drive power train between said intermediate and driven shafts and including a fluid pressure engaged brake for another element of said gear set, a source of fluid pressure adapted to be connected with said brakes, a manually operated one-way brake for each of said elements to be used in lieu of said fluid pressure engaged brakes when said source of fluid pressure is inoperative, each of said one-way brakes including a manually controlled pawl adapted to engage teeth on the respective elements and being adapted to complete the same power trains as the said respective first-named brakes between said intermediate and said driven shafts but only when said driven shaft tends to drive, and a one-way clutch between said intermediate and said drive shafts for completing a power train between said shafts exclusive of said hydrodynamic coupling device whereby said drive shaft may be driven from said driven shaft through said one-way clutch when one of said pawls is operative.

21. In a transmission for an automotive vehicle, the combination of a drive shaft, a driven shaft, means providing a power train between said shafts and including a friction engaging means for completing the power train when engaged, means providing another power train between said shafts and including a second friction engaging means for completing the power train when engaged, a fluid pressure operated piston for engaging each of said engaging means, a source of fluid pressure, an accelerator for the vehicle, a valve connected with said accelerator and operatively disposed between said source of fluid pressure and said pistons for supplying fluid pressure to either of said pistons when said accelerator is moved from a closed throttle position to an open throttle position, a pair of selector valves each operative between said first-named valve and one of said pistons for selectively connecting said first-named valve with either of said pistons, a governor responsive to the speed of said driven shaft, and a valve controlled by said governor and disposed operatively between said selector valves and said first-named valve, said governor valve being effective to hydraulically disconnect said selector valves and said first-named valve above a predetermined speed of said driven shaft.

22. In a transmission for an automotive vehicle, the combination of an accelerator, a drive shaft, a driven shaft, a gear set, means for providing a power train between said shafts and through said gear set and including a brake for an element of the gear set, means for providing another power train between said shafts and through said gear set and including a brake for another element of said gear set, a fluid pressure actuated piston for each of said brakes, a source of fluid pressure, a valve for operatively connecting said fluid pressure source and either of said pistons and connected with said accelerator whereby to apply fluid pressure to either of the pistons when the accelerator is moved from a closed throttle position to an open throttle position, a selector valve for each of said pistons for operatively connecting the pistons with said first-named valve, a clutch for providing a direct drive through the gear set, a piston for operating said last-named clutch, a governor responsive to the speed of said driven shaft, a valve operative between said first-named valve and said selector valves and actuated under the control of said governor, said last-named valve being effective above a predetermined speed of said driven shaft for hydraulically disconnecting said first-named valve and said selector valves and for connecting said fluid pressure source with the pistons for said direct drive clutch.

23. In a transmission for an automotive vehicle, the combination of an accelerator for the vehicle, a drive shaft, a driven shaft, a gear set, means for completing a low speed forward drive through the gear set and between said shafts and including a friction engaging means, means for completing a reverse drive through the gear set and between said shafts and including another friction engaging means, means under the control of said accelerator for selectively engaging either of said engaging means, a governor responsive to the speed of said driven shaft, a positive type clutch for providing a 1–1 drive between said shafts, and means under the control of said governor for disengaging said low speed engaging means and engaging said direct drive clutch above a predetermined speed of said driven shaft.

24. In a transmission for an automotive vehicle, the combination of an accelerator for the vehicle, a drive shaft, a driven shaft, a gear set, means for providing a low speed forward drive through the gear set and between said shafts and including a friction brake for an element of the gear set, means for providing a reverse drive through the gear set and between said shafts and including a friction brake for another element of said gear set, means under the control of said accelerator for engaging either of said brakes for completing the respective power trains when said accelerator is moved from a closed throttle position to an open throttle position, a positive type clutch for providing a 1–1 drive between said shafts, a governor responsive to the speed of said driven shaft, and means under the control of said governor and said accelerator for disengaging said low speed friction brake and engaging said 1–1 positive clutch when the accelerator is released from an open throttle position to a closed throttle position above a predetermined speed of said driven shaft.

25. In a transmission for an automotive vehicle, the combination of an accelerator for the vehicle, a drive shaft, a driven shaft, a gear set, means for completing a low speed forward drive through the gear set and between said shafts and including a friction brake for an element of said gear set, means for completing a reverse drive power train through the gear set and between said shafts and including a friction brake for another element of said gear set, a source of fluid pressure, a piston for each of said brakes for engaging the brakes, means under the control of said accelerator for connecting said fluid pressure source and either of said brake pistons for engaging the respective brake when said accelerator is moved from a closed throttle position to an open throttle position, selector means for determining which of said brakes shall be so operated, a governor responsive to the speed of said driven shaft, a positive clutch for providing a 1–1 drive between said shafts, a piston for engaging said positive clutch, and means under the control of said accelerator and said governor for disconnecting said fluid pressure source and the said friction brake for said low speed drive and for connecting said fluid pressure source and said piston for said positive clutch for upshifting the transmission from low speed drive to direct drive when the accelerator is released to closed throttle position above a predetermined speed of said driven shaft.

26. In a transmission for an automotive vehicle, the combination of an accelerator for the vehicle, a drive shaft, a driven shaft, means for completing a low speed drive between said shafts and including a gear set and a friction brake for an element of the gear set for completing the power train when engaged, a fluid pressure actuated piston for engaging said friction brake, a source of fluid pressure, a valve under the control of said accelerator for connecting said fluid pressure source and said piston when the accelerator is moved from a closed throttle position to an open throttle position for thereby engaging said brake to complete said power train, a friction clutch for causing said drive and driven shafts to rotate in unison, a fluid pressure actuated piston for engaging said friction clutch, a governor responsive to the speed of said driven shaft, a device under the control of said accelerator and actuated when said accelerator is released from an open throttle position to a closed throttle position, a device under the control of said governor and actuated when said governor reaches a predetermined speed, and a valve under the joint control of said two devices for applying fluid pressure to said last-named piston to engage said friction clutch and for disconnecting said fluid pressure source and said first-named piston to disengage said brake for changing the transmission from low speed drive to high speed drive when said two devices are simultaneously actuated.

27. In a transmission for an automotive vehicle, the combination of an accelerator for the vehicle, a drive shaft, a driven shaft, a gear set, means for providing a low speed forward drive through the gear set and between said shafts and including a friction brake for an element of said gear set, means for providing a reverse drive power train through the gear set and between said shafts and including a friction brake for another element of said gear set, means under the control of said accelerator for engaging either of said brakes when the accelerator is moved from a closed throttle position to an open throttle position, a friction clutch for providing a 1–1 drive between said shafts, a governor responsive to the speed of said driven shaft, a device under the control of said accelerator and actuated when said accelerator is released from an open throttle position to a closed throttle position, a device under the control of said governor and actuated when said governor reaches a predetermined speed, and means jointly under the control of said two devices for disengaging said low speed forward drive friction brake and engaging said friction clutch when said two devices are simultaneously actuated.

28. In a transmission for an automotive vehicle, the combination of an accelerator for the vehicle, a drive shaft, a driven shaft, a gear set, means for providing a low speed forward drive through the gear set and between said shafts and including a friction brake for an element of said gear set, means for providing a reverse drive power train through the gear set and between said shafts and including a friction brake for another element of the gear set, a fluid pressure actuated piston for engaging each of said friction brakes, a source of fluid pressure, a valve operated by said accelerator for connecting said source of fluid pressure with either of said pistons for engaging the respective brakes when the accelerator is moved from a closed throttle position to an open throttle position, valve means for selecting the brake which shall be so actuated, a friction clutch for providing a 1–1 drive between said shafts, a fluid pressure actuated piston for engaging said friction clutch, a governor responsive to the speed of said driven shaft, a device under the control of said accelerator and actuated when said accelerator is released from an open throttle position to a closed throttle position, a device under the control of said governor and actuated when said governor reaches a predetermined speed, and a valve under the joint control of said two devices for disconnecting the piston for said low forward speed friction brake from said source of fluid pressure and connecting said fluid pressure source with the piston for said friction clutch when said two devices are simultaneously actuated.

29. In transmission mechanism, the combination of a drive shaft, a driven shaft, an accelerator for the vehicle, means for providing a high speed power train between said shafts and including a positive clutch for completing the power train, means for providing a low speed power train between said shafts and including a planetary gear set and a friction brake for an element of the gear set which when engaged completes the power train, a fluid pressure responsive piston for operating said brake, a pump for supplying fluid pressure to said piston, an accumulator for storing the fluid under pressure discharged by said pump whereby for giving a quick operation to the friction brake, means under the control of said accelerator for disengaging said positive clutch and for connecting said accumulator and pump with said piston for engaging said brake for downshifting the transmission from its high speed ratio to its low speed ratio when the accelerator is moved from a closed throttle position to an open throttle position, and means for interrupting the torque delivered by the vehicle engine for allowing such disengagement of said positive clutch when the accelerator is given this movement.

30. In a transmission for an automotive vehicle, the combination of an accelerator for the vehicle, a drive shaft, a driven shaft, a hydrodynamic coupling device driven by said drive shaft, a gear set, means for completing a low speed forward drive through the gear set and between said hydrodynamic device and said driven shaft and including a friction engaging means, means for completing a reverse drive through the gear set and between said hydrodynamic device and said driven shaft and including another friction engaging means, means under the control of said accelerator for selectively engaging either of said friction engaging means, a governor responsive to the speed of said driven shaft, a positive type clutch for providing a one to one drive between said hydrodynamic device and said driven shaft, and means under the control of said governor for disengaging said low speed friction engaging means and engaging said positive type clutch above a predetermined speed of said driven shaft.

31. In a transmission for an automotive vehicle, the combination of an accelerator for the vehicle, a drive shaft, a driven shaft, a hydrodynamic coupling device driven by said drive shaft, means for completing a low speed power train between said coupling device and said driven shaft and including a gear set and a friction engaging means for completing the power train when engaged, control means actuated by said accelerator adjacent closed throttle position thereof and operative for engaging said friction engaging means to complete said power train between said hydrodynamic coupling device and said driven shaft when said accelerator is moved from a closed throttle position to a partially open throttle position to start the vehicle from rest, a friction clutch for completing a high speed power train between said coupling device and said driven shaft, a device under the control of said accelerator and actuated when said accelerator is released from an open throttle position to a closed throttle position, and means under the control of said device for engaging said friction clutch to complete said high speed power train when said device is actuated when said low speed power train is operative.

32. In a transmission for an automotive vehicle, the combination of a drive shaft adapted to be driven by the vehicle motor, a driven shaft adapted to be connected to the driving wheels of the vehicle, a hydrodynamic coupling device driven by said drive shaft, an intermediate shaft driven by said device, a gear set for connecting said intermediate shaft and said driven shaft, an engaging means for completing the power train through said gear set and between said two last-mentioned shafts, an engaging means for connecting directly together said intermediate and said driven shafts for providing a direct drive between the shafts in lieu of the drive through said gear set, a one-way clutch between said intermediate shaft and said driven shaft and a one-way clutch between said intermediate shaft and said drive shaft, said one-way clutches being so arranged that said driven shaft may drive said intermediate shaft and said intermediate shaft may drive said drive shaft all at a one to one ratio whereby the vehicle motor may be started by pushing or towing the vehicle and thereby driving said driven shaft, when said two last-named engaging means are inoperative for completing the corresponding power trains between said intermediate and said driven shafts.

33. In transmission mechanism, the combination of a drive shaft, a driven shaft, means for providing a low speed power train between said shafts, means for providing a high speed power train between said shafts and including a positive type clutch for completing the power train, said positive clutch comprising two sets of engageable clutch teeth, one set of said clutch teeth being movable into clutching engagement with the other, blocker teeth for preventing clutching engagement between said sets of clutch teeth prior to synchronization thereof, a brake for one of said shafts for synchronizing the shafts prior to engagement of said positive clutch in changing the drive from said low speed power train to said high speed power train, means for engaging said brake, and means carried by said movable set of clutch teeth for engaging said brake when said blocker teeth are effective to prevent clutching engagement between said sets of clutch teeth.

34. In transmission mechanism, the combination of a drive shaft, a driven shaft, means for providing a low speed power train between said shafts, means for providing a high speed power train between said shafts and including a positive type clutch for completing the power train, said positive type clutch including a shiftable clutch element having clutch teeth engageable with clutch teeth carried by a relatively stationary element, blocker teeth disposed between the clutching elements for preventing engagement thereof prior to synchronization between the elements, a brake for one of said shafts for synchronizing the speeds of the shafts prior to engagement of said positive clutch in changing the drive from said low speed power train to said high speed power train, and means controlled by said shiftable clutch element and rendered effective when the shiftable clutch element is moved slightly toward engagement with the relatively stationary element for effecting engagement of the brake and maintaining the brake engaged for so long as said blocker teeth are effective to prevent engagement of the clutching elements.

35. In transmission mechanism for an automotive vehicle having an accelerator, the combination of a drive shaft, a driven shaft, means for providing relatively low and high speed power trains between said shafts and including a positive type clutch for completing the high speed power train when engaged, said positive clutch comprising a first clutch element movable into clutching engagement with a second clutch element and including blocking means for preventing clutching engagement between said elements prior to synchronization therebetween, a brake for one of the shafts for synchronizing the speeds of the shafts prior to engagement of the positive clutch in changing the drive from the low speed power train to the high speed power train, means controlled by said accelerator and effective when the accelerator is released to a closed throttle position for engaging said clutch and effecting a change in the drive from said low speed power train to said high speed power train, and means rendered effective during the shifting of the shiftable clutch element from a disengaged position into engagement with the second clutch element for actuating said brake to effect synchronization of the shafts.

36. In a transmission for an automotive vehicle having a driving engine, the combination of a drive shaft, a driven shaft, means for completing a power train between said shafts and including an engaging means, a one-way engaging means for use in lieu of said first-named engaging means for completing said power train from said driven shaft to said drive shaft but not from said drive shaft to said driven shaft, and power operated means for holding said one-way engaging means disengaged when the engine is operated.

37. In a transmission for an automotive vehicle having a driving engine, the combination of a drive shaft, a driven shaft, a gear set, an engaging means for completing a forward drive through said gear set and between said shafts, an engaging means for completing a reverse drive through said gear set and between said shafts, both of said engaging means being power-operated, manually controlled one-way engaging means for use in lieu of each of said first-named engaging means for completing the respective power trains from said driven shaft to said drive shaft, and power operated means for disengaging said one-way engaging means when the engine functions to transmit the drive to said driven shaft.

38. In a transmission, the combination of a drive shaft, a driven shaft, an engaging means for completing a power train between said shafts and including a motor for engaging the engaging means, a source of power operated by one of said shafts and adapted to be connected with said motor for engaging the engaging means, and a manually controlled one-way engaging device for use in lieu of said first-named engaging means for completing said power train from said driven shaft to said drive shaft but not from said drive shaft to said driven shaft when the drive shaft is inoperative but releasable on operation of said drive shaft, and manual means for maintaining said one-way engaging device in disengaged position.

39. In a transmission, the combination of a drive shaft, a driven shaft, means for completing a power train between said shafts and including a one-way engaging means, said engaging means comprising a pawl on one engaging means part meshable with teeth on another engaging means part, and means for manually controlling movement of the pawl into and out of engagement with said teeth, said teeth and said pawl having inclined abutting surfaces which are inclined from normal slightly less than the friction angle, with the friction angle being defined as that angle of the pawl and teeth at which slipping would begin between the pawl and teeth when the engaging means parts are under load so that the pawl would disengage from the other engaging means part, said angles on the teeth and pawl allowing withdrawal of the pawl from a tooth by manual effort while the tooth is exerting force on the pawl.

40. In a transmission, the combination of a drive shaft, a driven shaft, a gear set, a brake for an element of said gear set for completing a power train through the gear set and between said shafts, said brake including a pawl adapted to engage any one of a series of teeth on said element, and means for moving said pawl out of engagement with said teeth by manual effort, said teeth being inclined from normal slightly less than the friction angle and the end of said pawl being similarly inclined, with the friction angle being defined as that angle at which slipping would begin between the pawl and coacting teeth when the pawl and element are under load, whereby the pawl can be withdrawn from any one of said teeth when said pawl is engaged therewith and there is torque on said element.

References Cited in the file of this patent

UNITED STATES PATENTS

| | | |
|---|---|---|
| 1,272,337 | Harvey | July 9, 1918 |
| 1,553,729 | Stevens | Sept. 15, 1925 |
| 1,883,498 | Billingsley et al. | Oct. 18, 1932 |
| 1,997,575 | Cummins | Apr. 16, 1935 |
| 2,021,574 | Cottrell | Nov. 19, 1935 |
| 2,029,070 | Higbee | Jan. 28, 1936 |
| 2,029,118 | Patterson | Jan. 28, 1936 |
| 2,329,724 | Maurer | Sept. 21, 1943 |
| 2,343,955 | Cotterman | Mar. 14, 1944 |
| 2,516,203 | Greenlee et al. | July 25, 1950 |
| 2,568,135 | Vincent | Sept. 18, 1951 |
| 2,670,064 | Hasbany | Feb. 23, 1954 |
| 2,682,177 | Kelbel | June 29, 1954 |